July 3, 1962 H. LESSOFF 3,042,617
MAGNETIC BODIES AND METHODS OF PREPARATION THEREOF
Filed Dec. 31, 1958 2 Sheets-Sheet 1

INVENTOR.
HOWARD LESSOFF
BY W.S. Hill
AGENT

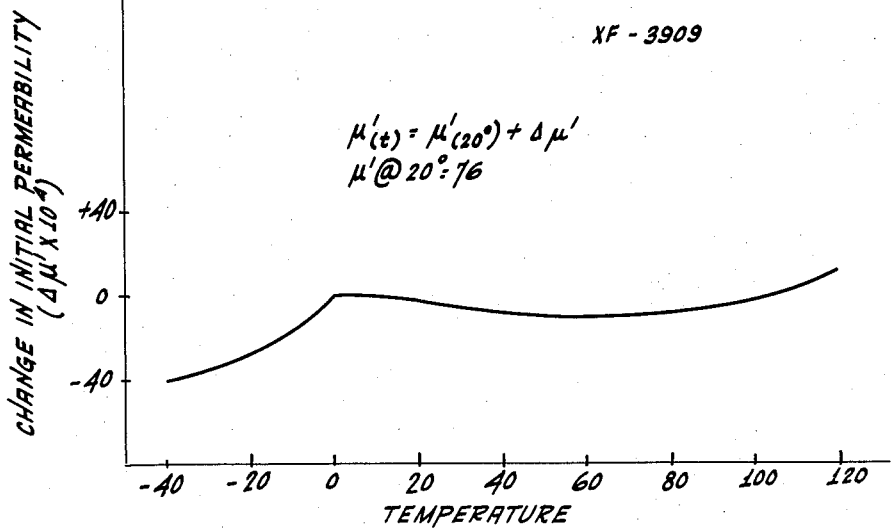
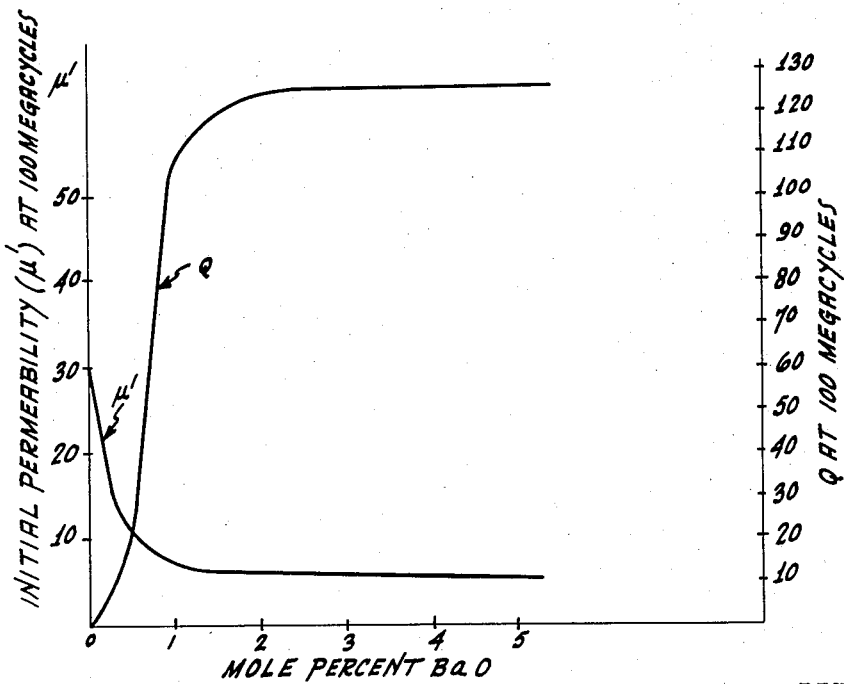

3,042,617
MAGNETIC BODIES AND METHODS OF PREPARATION THEREOF

Howard Lessoff, Milton, Mass., assignor to Radio Corporation of America, a corporation of Delaware
Filed Dec. 31, 1958, Ser. No. 784,388
8 Claims. (Cl. 252—62.5)

This invention relates to magnetic bodies and particularly, but not necessarily exclusively, to magnetic bodies of sintered ferrite crystallites having improved initial permeabilities and improved loss characteristics at high and low frequencies.

The term "ferrite" as used herein refers to a class of inorganic compounds having a spinel structure and the molar formula $M^{2+}(M^{3+})_2O_4$, where $M^{2+}$ may be one or more divalent cations and $M^{3+}$ may be one or more trivalent cations one of which is iron.

Magnetic bodies consisting essentially of sintered ferrite crystallites, also referred to herein as ferrite bodies, are useful in many electronic devices; for example, as cores in antennas, inductors, transformers, and other low loss applications. Previous ferrite bodies for these applications exhibit a high initial permeability and a low loss characteristic at frequencies up to 50 megacycles. Now that operating frequencies have been extended upward to 1000 megacycles, it is desirable to provide ferrite bodies having high initial permeabilities and low loss characteristics up to these high frequencies.

An object of this invention is to provide improved magnetic bodies of sintered ferrite crystallites and improved methods for preparing said bodies.

A further object is to provide magnetic bodies having high initial permeabilities and low loss characteristics at frequencies above 50 megacycles.

The magnetic bodies of the invention consist essentially of sintered nickel-zinc ferrite crystallites having incorporated therein up to 10.0 mol percent barium oxide. The ferrite bodies herein containing barium oxide exhibit increased initial permeabilities and reduced magnetic losses at frequencies above 50 megacycles, and are useable in low loss applications at these high frequencies.

The processes of the invention comprise the usual processes for preparing bodies of sintered ferrite crystallites except that up to 10.0 mol percent barium oxide is added and mixed with the batch of raw material prior to forming and sintering.

The novel features of the invention are set forth in greater detail in the following description in conjunction with the following drawing in which:

FIGURE 3 is a graph illustrating the change in initial permeability with temperature for a typical ferrite body of the invention.

FIGURE 4 is a graph illustrating the effect of increasing proportions of barium oxide on the values of Q and $\mu'$ for a typical nickel-zinc ferrite.

EXAMPLE 1

Pure, fine particle oxides are rough mixed in the proportion as follows:

| | Mol |
|---|---|
| Nickelous Oxide, NiO | 0.328 |
| Zinc Oxide, ZnO | 0.172 |
| Ferric Oxide, $Fe_2O_3$ | 0.500 |
| Barium Oxide, BaO | 0.050 |

Intimate mixing is accomplished by wet ball milling; i.e., tumbling a water slurry of the mixture of oxides with steel balls in a closed steel jar for about one hour. The mixed slurry is dried at about 200° C., and the dry mixture is ground and sieved to a fine powder.

An organic binder and lubricant is now added to aid in the forming step which follows. For each 100 grams of mixture, 1 gram of a low molecular weight solid polyethylene glycol, such as Carbowax 1000, Union Carbide and Chemical Corp., New York, N.Y., and 4 grams Trigamine stearate emulsified in hot water is added. Trigamine is the trademark of an emulsifying agent marked by Glyco Products Company, Inc., Brooklyn, New York. These constituents are mixed together using additional water if necessary to obtain a uniform distribution of the added material. The water is evaporated by heating at about 75° C. and the dry material is sieved to the desired aggregate size.

Portions of the sieved material are pressed at about 10 tons per square inch in a polished steel mold (die size 0.228 inch O.D. x 0.118 inch I.D.) to form bodies of a toroidal shape which will have a size after sintering of about .200 inch O.D. x .100 inch I.D. x .050 inch thick.

The pressed bodies are placed on a sillimanite setter plate and sintered to maturity, preferably in an electric furnace. The organic binder and lubricant are volatilized by heating the pressed body from room temperature to 300° C. in air and holding at that temperature for about two hours. Complete reaction, crystallization, and sintering is accomplished by increasing the temperature in about five hours to about 1200° C. and holding at this temperature for about one hour. The heating at about 1200° C. is carried on in an air atmosphere. During the heating, the materials of the batch react to produce ferrite crystallites and the crystallites are sintered to a coherent body. The furnace is then shut off and the bodies allowed to cool to room temperature in the furnace in air in about 16 hours.

Figure 1:
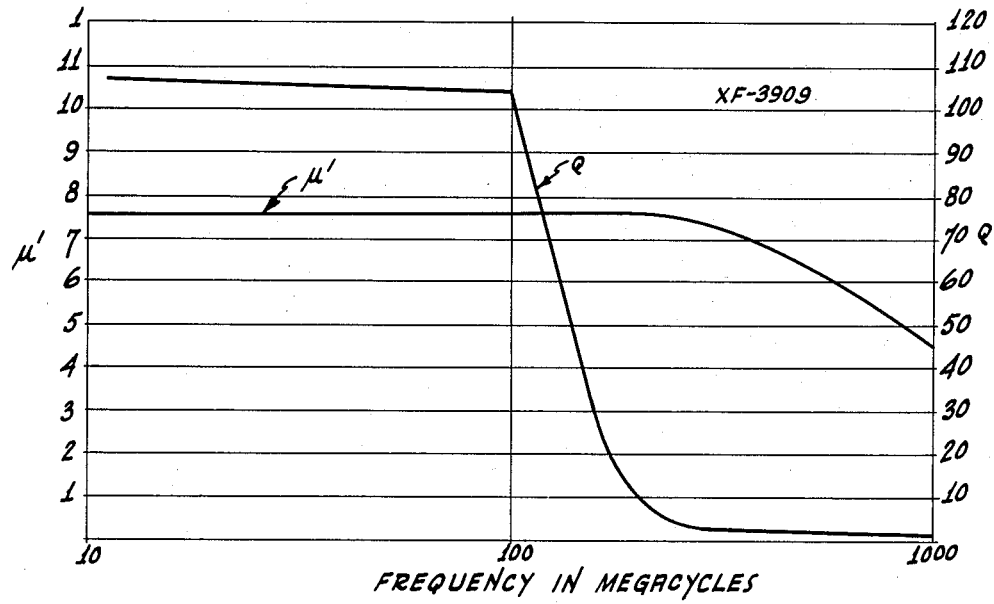
FIGURES 1 and 2 are graphs showing the quality factor Q and the in phase permeability $\mu'$ at frequencies up to 1000 megacycles for two ferrite bodies of the invention.

The magnetic properties of the ferrite bodies prepared according to the example and ferrite bodies prepared by a similar method without barium oxide are compared in Table I, demonstrating the improvement in the permeability and loss characteristic of ferrite bodies of the invention at frequencies above 50 megacycles (mc.). The data for the ferrite body containing barium oxide (BaO) is shown in FIGURE 1. All ferrite bodies reported herein were either wound with No. 34 wire and measured on a Boonton Q meter models 190A and 260A at the frequencies indicated or measured on slotted line as noted.

Table I

COMPOSITION 3909

[$\mu_0 = 7.9$ temp. coef. of $\mu_0 = -136$ part per million/° C.]

| Freq. (mc.) | With 5 mol percent BaO | | Without BaO | |
|---|---|---|---|---|
| | Q | $\mu'$ | Q | $\mu'$ |
| 11 | 108 | 7.6 | 45 | 60 |
| 50 | 101 | 7.6 | less than 1 | ⎫ |
| 100 | 105 | 7.6 | do | ⎪ |
| 150 | 35 | 7.6 | do | ⎬ because of high loss cannot be determined. |
| 200 | 19 | 7.6 | do | ⎪ |
| 250 | 2.4 | 7.6 | do | ⎪ |
| 500 [1] | 1.7 | 6.1 | do | ⎪ |
| 750 [1] | 1.5 | 5.5 | do | ⎪ |
| 900 [1] | 1.25 | 5.4 | do | ⎭ |

[1] Measured on slotted line equipment.

EXAMPLE 2

Ferrite bodies are prepared according to Example 1 except the raw batch consisted of:

|  | Mol |
|---|---|
| Ferric oxide | 0.500 |
| Zinc oxide | 0.172 |
| Nickel oxide | 0.328 |
| Molybdenum oxide | 0.005 |
| Barium oxide | 0.050 |

Figure 2:
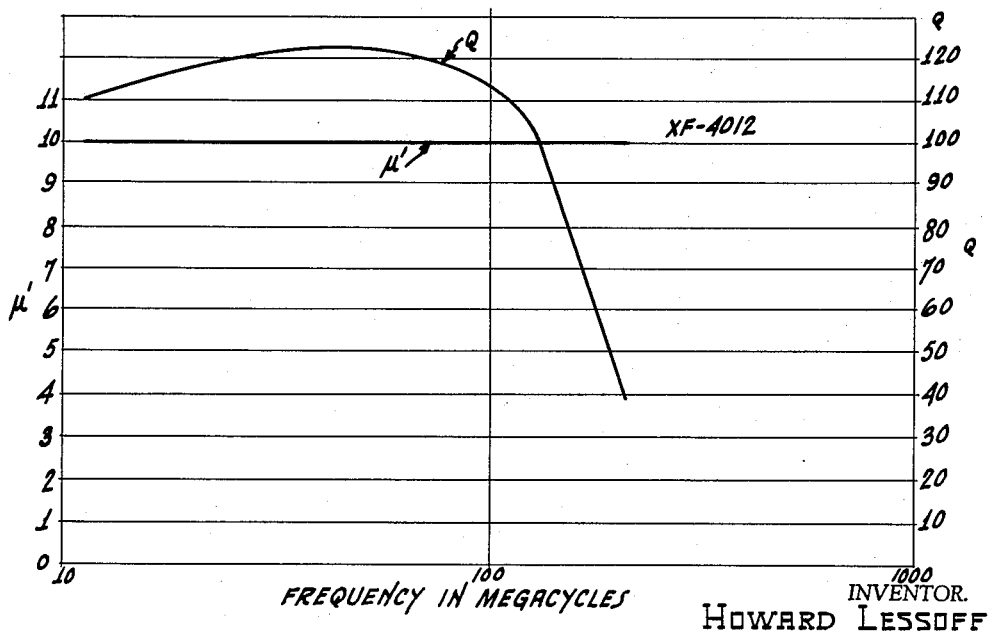

The ferrite bodies of Example 2 with and without barium oxide were tested as in Example 1 and data thereon is given in Table II and FIGURE 2.

Table II
COMPOSITION 4012

| Frequency (mc.) | With BaO | | Without BaO | |
|---|---|---|---|---|
|  | Q | μ' | Q | μ' |
| 11 | 110 | 10.0 | 109 | 65 |
| 25 | 120 | 10.0 | 25 | 65 |
| 50 | 120 | 10.0 | less than 1 |  |
| 100 | 116 | 10.0 |  |  |
| 200 | 45 | 10.0 |  |  |

Barium oxide may be added to any nickel-zinc ferrite composition to improve the initial permeability and loss characteristic of a body thereof. The proportion used may vary up to 10.0 mol percent, preferably between 0.5 and 10.0 mol percent. The ferrite composition may contain a proportion of iron oxide which is equal to or less than stoichiometric; i.e. the molar ratio of $Fe^{3+}$ to $M^{2+}$ is equal to or less than 2 to 1.

As shown in FIGURES 1 and 2 the addition of barium oxide extends the useful frequency range of ferrite bodies beyond 50 megacycles by decreasing the loss characteristics of the ferrite body. Improvements in the temperature coefficient of initial permeability is also affected by barium oxide addition. A typical ferrite shows approximately 1000 p.p.m./° C., whereas the ferrites of Examples 1 and 2 containing barium oxide are 0±100 p.p.m./° C. FIGURE 3 illustrates the change in initial permeability with temperature for the ferrite of Example 1.

Mixing may be done alternatively by coprecipitating from solution the required proportion of oxides, or other ingredients which upon heating decompose into oxides. Mixtures obtained by this procedure are more intimately mixed, and so they react and crystallize at lower temperatures. The previously described process of mixing the solid ingredients, however, is preferred.

Calcining and grinding operations before forming are optional and are used to aid intimate mixing and to help control the shrinkage and porosity of the product. It is essential to control shrinkage in order to obtain products of uniform size and shape. The porosity of the material may be varied by calcining at different particle sizes, or by adding inorganic "fluxes" such as silicon dioxide, $SiO_2$.

Binders are added to make the powder particles cohere temporarily after they are pressed into different shapes and before sintering. Lubricants may also be added to facilitate molding. The binders and lubricants added are usually organic compounds, which can be volatilized by heating the formed bodies at low temperatures. Some materials which may serve as binders and lubricants are polyvinyl alcohol, diethylene glycol esters of rosin and methyl esters of rosin.

The pressures used for forming these materials are less critical than for the molding of powdered iron cores with organic binders. Pressures of about 5 to 10 tons per square inch have been found to be satisfactory. The material may also be extruded. For extrusions the content of the organic binder, lubricants, and water are usually higher, and the correct amount needed must be experimentally determined. In general, different shapes may be produced by processes similar to those used in the preparation of ceramics, such as extrusions, hydrostatic pressing and slip casting.

The final reaction, crystallization and sintering must be controlled carefully. In this procedure, the shaped body is heated to some temperature between 950° C. and 1450° C. in oxygen, air or nitrogen, depending upon the composition chosen and the properties desired. At these high temperatures, the cations and anions of the mixed oxides diffuse and react, and crystallites of a ferrite of spinel structure are produced. The formation of the ferrite is so rapid that when shaped bodies are heated from one to five minutes at about 1300° C. they show complete spinel X-ray diffraction patterns. Further heating influences chiefly the rate of growth of the crystals. Low temperatures and/or short periods of crystallization give small crystals, and high temperatures and/or long periods of crystallization give large crystals. The effect of the crystallizing conditions on the initial permeability and the loss characteristics of Example I (3909) at 100 mc. is shown in Table III.

Table III

| Crystallizing temperature | μ' | Q |
|---|---|---|
| 1,125° | 4.9 | 125 |
| 1,150° | 5.5 | 110 |
| 1,175° | 7.6 | 105 |
| 1,200° | 8.1 | 70 |
| 1,225° | 8.8 | 18 |
| 1,250° | 12.5 | 8 |

Because of the partial dissociation of the oxides at the crystallization temperatures, certain compositions require an increase in the positive charge of some or all of the cations for optimum ferromagnetic properties. A post-crystallization heat treatment will sometimes accomplish this. This process is a reversal of dissociation; that is, oxygen is absorbed by the material, and the oxidation states of the cations are increased. The rate of this absorption is controlled by the porosity and temperature of the material, and by the ambient atmosphere. These heat treatments are made at temperatures of about 350° C. to 950° C., i.e., below the normal temperature of crystallization. For the nickel-zinc ferrite of the example, satisfactory results may be obtained by turning the furnace off after the required heating at 1025° C., and allowing the material to cool to room temperature in air. Slightly better ferromagnetic properties may be obtained if an atmosphere of oxygen is used and the cooling rate experimentally determined for the optimum property desired. In some cases, it is desirable to have a definite ratio of cations of different oxidation states, which have been formed during high-temperature crystallization, remain in the finished material. This condition may be attained by quenching (rapid cooling), or by making the final material non-porous. In the latter case, absorption of oxygen is minimized during cooling of the material.

Some typical ferrite body compositions are shown in Table IV and their electrical characteristics are shown in FIGURE 4.

Table IV
[Composition in mol percent]

| Material | No. 1 | No. 2 | No. 3 | No. 4 | No. 5 | No. 6 |
|---|---|---|---|---|---|---|
| $Fe_2O_3$ | 50.0 | 50.0 | 50.0 | 50.0 | 50.0 | 50.0 |
| NiO | 32.8 | 32.8 | 32.8 | 32.8 | 32.8 | 32.8 |
| ZnO | 17.2 | 17.2 | 17.2 | 17.2 | 17.2 | 17.2 |
| BaO | 0 | 0.25 | 0.50 | 1.0 | 2.0 | 5.0 |

What is claimed is:
1. A magnetic body having a value of Q greater than 100 at about 100 megacycles consisting essentially of sintered particles of cubic nickel-zinc ferrite containing about 50 mol percent $Fe_2O_3$ and having incorporated therein between 0.5 and 10.0 mol percent barium oxide.

2. A magnetic body having a value of Q greater than 100 at about 100 megacycles consisting essentially of sintered particles of cubic nickel-zinc ferrite containing about 50 mol percent $Fe_2O_3$ and having incorporated therein between 0.5 and 10.0 mol percent barium oxide, said nickel zinc ferrite being stoichiometrically deficient in iron.

3. A magnetic body having a value of Q greater than 100 and a value of $\mu'$ greater than 5 at about 100 megacycles consisting essentially of sintered particles of cubic nickel-zinc ferrite containing about 50 mol percent $Fe_2O_3$ and having incorporated therein about 5.0 mol percent barium oxide.

4. A magnetic body having a value of Q greater than 100 and a value of $\mu'$ greater than 5 at about 100 megacycles consisting essentially of sintered nickel-zinc ferrite crystallites having a cubic crystal structure having incorporated therein between 0.5 and 10.0 mol percent barium oxide, said nickel-zinc ferrite comprising 0.500 mol ferrite oxide, 0.172 mol zinc oxide, and 0.328 mol nickel oxide.

5. The magnetic body of claim 4 containing 5.0 mol percent barium oxide.

6. A method for preparing a magnetic body consisting essentially of sintered ferrite crystallites having a cubic crystal structure comprising mixing a batch of raw material in proportions to yield a nickel-zinc ferrite upon heating containing about 50 mol percent $Fe_2O_3$ and between 0.5 and 10.0 mol percent barium oxide, forming said mixture to a desired shape, and then sintering the shaped mixture between about 950° C. and 1450° C. to react said raw materials to produce crystallites of said ferrite and to sinter said crystallites into a coherent body.

7. A method for preparing a magnetic body consisting essentially of sintered ferrite crystallites having a cubic crystal structure comprising mixing a batch of raw materials comprising in the molar proportions 0.500 ferric oxide, 0.172 zinc oxide, and 0.328 nickel oxide and a portion of barium oxide between 0.5 and 10.0 mol percent of said batch forming said mixture to a desired shape, and then heating said shape at about 1200° C. for about one hour in air to react said raw materials to produce crystallites of said ferrite and to sinter said crystallites into a coherent body.

8. The method of claim 7 wherein said barium oxide is present as 5.0 mol percent of said batch.

References Cited in the file of this patent

UNITED STATES PATENTS

| | | |
|---|---|---|
| 1,997,193 | Kato et al. | Apr. 9, 1935 |
| 2,565,861 | Leverenz et al. | Aug. 28, 1951 |
| 2,579,267 | Leverenz et al. | Dec. 18, 1951 |
| 2,579,978 | Snoek et al. | Dec. 25, 1951 |
| 2,736,708 | Crowley et al. | Feb. 28, 1956 |
| 2,762,777 | Went et al. | Sept. 11, 1956 |
| 2,848,310 | Remeika | Aug. 19, 1958 |
| 2,877,183 | Eckert | Mar. 10, 1959 |
| 2,893,830 | Brixner | July 7, 1959 |

FOREIGN PATENTS

| | | |
|---|---|---|
| 735,375 | Great Britain | Aug. 17, 1955 |
| 737,284 | Great Britain | Sept. 21, 1955 |
| 1,110,334 | France | Oct. 12, 1955 |
| 88,281 | Netherlands | Apr. 19, 1958 |

OTHER REFERENCES

Jonker et al.: Philips Tech. Rev., November 1956, pages 145–154 (particularly pages 146, 148).

UNITED STATES PATENT OFFICE
CERTIFICATE OF CORRECTION

Patent No. 3,042,617                                      July 3, 1962

Howard Lessoff

It is hereby certified that error appears in the above numbered patent requiring correction and that the said Letters Patent should read as corrected below.

Column 2, Table I, column 3, line 9 thereof, for "5.4" read -- 4.5 --; column 5, line 22, for "ferrite", second occurrence, read -- ferric --.

Signed and sealed this 20th day of November 1962.

(SEAL)
Attest:

ERNEST W. SWIDER
Attesting Officer

DAVID L. LADD
Commissioner of Patents